(12) United States Patent
Oh et al.

(10) Patent No.: US 7,902,949 B2
(45) Date of Patent: Mar. 8, 2011

(54) ELECTRIC POWER CONNECTION PART OF MAGNETIC CLUTCH FIELD COIL ASSEMBLY

(75) Inventors: Sung Taeg Oh, Daejeon (KR); Suk Jae Chung, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 846 days.

(21) Appl. No.: 11/853,909

(22) Filed: Sep. 12, 2007

(65) Prior Publication Data

US 2008/0060902 A1  Mar. 13, 2008

(30) Foreign Application Priority Data

Sep. 12, 2006 (KR) .................. 10-2006-0088258

(51) Int. Cl.
*F16D 27/00* (2006.01)

(52) U.S. Cl. ....... 335/299; 336/107; 336/192; 292/84.96

(58) Field of Classification Search .................. 335/296, 335/299; 336/107, 192; 292/84.1, 84.9, 292/84.96–84.961

See application file for complete search history.

(56) References Cited

U.S. PATENT DOCUMENTS

2007/0017770 A1  1/2007 Oh et al.

FOREIGN PATENT DOCUMENTS

| JP | H07127662 | 4/1996 |
| WO | 2004067982 | 8/2004 |

*Primary Examiner* — Ramon M Barrera
(74) *Attorney, Agent, or Firm* — Lowe Hauptman Ham & Berner LLP

(57) ABSTRACT

The present invention relates to an electric power connection part of an electromagnetic cluth field coil assembly coupled with a vehicle compressor.

Since the electric power connection part has the discharge device and/or the magnetic field elimination device and the terminal which are integrally formed by injection molding in the housing assembly of a electromagnetic cluth field coil assembly, it is possible to rapidly and facilely perform the assembling process, increase the productivity and also reduce fabricating costs.

12 Claims, 6 Drawing Sheets

- Prior Art -

- Prior Art -

- Prior Art -

ELECTRIC POWER CONNECTION PART OF MAGNETIC CLUTCH FIELD COIL ASSEMBLY

TECHNICAL FIELD

The present invention relates to an electric power connection part of an electromagnetic clutch field coil assembly coupled with a vehicle compressor, and more particularly, to a structure of an electric power connection part of an electromagnetic clutch field coil vehicle power assembly, which can be rapidly and facilely connected to an electric power bracket of the vehicle.

BACKGROUND ART

In general, a vehicle compressor for an air conditioner is operated by means of a driving power of an engine, and an electromagnetic cluth is mounted together to intermittently operate the vehicle compressor only in a case where air conditioning is required.

FIG. 1 illustrates a general coupling structure of a vehicle compressor and an electromagnetic clutch. An operation principle of the compressor 20 will be briefly described below with reference to FIG. 1.

First, in a case where an engine is operating, a pulley 60 connected from a driving shaft of the engine (not shown) through a belt (not shown) rotates. Further, the pulley 60 is connected to a rotating shaft of the compressor 20 via the electromagnetic clutch. In general, a rotor 80 is coupled with the pulley 60, and an electromagnetic clutch field coil assembly 1 having a coil 111 and a coil housing 12 is disposed with the rotor 80 at a minute interval. Furthermore, the rotor 80 is connected to the rotating shaft of the compressor 20 with a bearing 70 interposed therebetween.

If a driver turns on a switch for an air conditioner in this state, a disk 21 fixedly coupled with the rotating shaft of the compressor 20 and a disk 61 fixedly coupled with the pulley 60 are contacted with each other to rotate together by means of a frictional force while electric power is being applied to the electromagnetic cluth field coil assembly 1, so that the compressor 20 is operated.

On the contrary, unless electric power is applied to the electromagnetic clutch field coil assembly 1 through electric power connection lines 30 and 40, since the disk 61 of the pulley 60 and the disk 21 of the compressor 20 are separated from each other, a power is cut off and the compressor 20 does not operate.

Electric power may be applied to the electromagnetic clutch field coil assembly 1 by manually controlling the switch of the air conditioner, and the application of the electric power to the electromagnetic clutch field coil assembly 1 may be automatically controlled depending on a room temperature of a vehicle by connecting it to an engine control system (ECU) that is not shown.

Meanwhile, in a conventional electric power connection part, as shown in FIG. 2a, the electric power connection lines 30 and 40 connected to the electromagnetic clutch field coil assembly 1 are fastened to a body of the compressor 20 using a fastening member 50, one ends of the electric power connection lines 30 and 40, where the fastening member 50 is coupled, are respectively formed with a ring terminal 41, and the other ends are connected to a housing assembly 10 coupled with the compressor 20 through a bracket 11.

Since the electric power connection lines 30 and 40 are fastened as described above, it is prevented that the lines 30 and 40 are disconnected by sway while the vehicle is moving.

And as shown in FIG. 2b, a diode 51 and a resistor 52 are connected with each of the plus(+) and minus(−)electric power connection lines 30 and 40, and then connected to a connector 31 through a sub-connection line 53. The diode 51 and the resistor 52 are protected by a contractive tube 54.

However, since the above-mentioned electric power connection part should have a process for fastening the body of the compressor 20 using the fastening member 50 and the contractive tube 54, there are some problems that a manufacturing process is complicated and work processes are increased.

Further, in a case that the fastening member 50 comes loose and thus the electric power connection lines 30 and 40 are released from the fastened status, the electric power connection lines may be adhered to the compressor 20 with a high temperature. Thus, there is a further problem that it causes a trouble of the electromagnetic cluth field coil assembly.

Furthermore, since the diode 51 and the resistor 52 are positioned to be very close to the compressor 20, there is another problem that it has a bad influence that performance of the electromagnetic clutch field coil assembly is deteriorated, and the like.

DISCLOSURE OF THE INVENTION

It is an object of the present invention to provide an electric power connection part of an electromagnetic clutch field coil assembly, which has an electric power connection part having a discharge device, a magnetic field elimination device and a terminal which are integrally formed by injection molding, and which is coupled to a compressor through a bracket, thereby rapidly and facilely performing an assembling process.

It is another object of the present invention to provide an electric power connection part of an electromagnetic clutch field coil assembly, wherein the magnetic field elimination device received in the electric power connection part is connected with the compressor and the discharge device is connected with the terminal so that they can be rapidly and facilely connected through the single terminal.

It is yet another object of the present invention to provide an electric power connection part of an electromagnetic clutch field coil assembly, wherein the magnetic field elimination device, the discharge device and electric wires are connected to each other through a holder so that it is facile to perform the assembling process and also deformation or bias due to an injection molding pressure is prevented.

It is yet another object of the present invention to provide an electric power connection part of an electromagnetic clutch field coil assembly, wherein an electric power connection part removably coupled at the body of the compressor through a bracket so that it is facile to perform the assembling process.

To achieve these objects of the present invention, there is provided an electric power connection part of an electromagnetic clutch field coil assembly connected with an electric power connector at a side of a vehicle engine, wherein the electric power connection part comprises a sleeve assembly which is installed at the electromagnetic clutch field coil assembly, and a housing assembly which is connected with the sleeve assembly through electric wires; the housing assembly comprises a housing which accommodates a discharge device for absorbing a surge voltage, and a bracket of which one end is coupled with a compressor and the other is coupled with the housing; one end of the discharge device is connected with a terminal connected with the electric power connector and the other end is connected with an electrical terminal which is electrically connected with the bracket.

Preferably, a magnetic field elimination device for eliminating a residual magnetic field is connected between the discharge device and the electrical terminal.

In this case, the electrical terminal has a protrusion formed at a lower side thereof so as to be electrically connected with the bracket.

Further, the electrical terminal has a lower side thereof which is surface-contacted with the bracket so as to be electrically connected with the bracket.

Furthermore, the electrical terminal is coupled with the bracket by a bolt so as to be electrically connected.

Further, the electrical terminal is welded with the bracket so as to be electrically connected.

Further, the discharge device, the terminal and the electrical terminal are injection-coupled to one another in the housing assembly Meanwhile, the discharge device is injection-coupled in a status of being fixed by a holder.

Further, the discharging device, the magnetic field elimination device, the terminal and the electrical terminal are injection-coupled in the housing assembly.

Furthermore, the discharging device, the magnetic field elimination device, the terminal and the electrical terminal are injection-coupled in the housing assembly and the discharging device and the magnetic field elimination device are injection-coupled in a status of being fixed by a holder.

Meanwhile, the discharging device is a diode, and the magnetic field elimination device is a resistor.

BEST MODE FOR CARRYING OUT THE INVENTION

Hereinafter, preferred embodiments of the present invention will be described in detail with reference to the accompanying drawings.

An electromagnetic clutch is coupled to a vehicle compressor 2 so as to control it. The electromagnetic clutch is operated by a driving power of an engine and is intermittently operated only when air conditioning is required.

Figure 1:
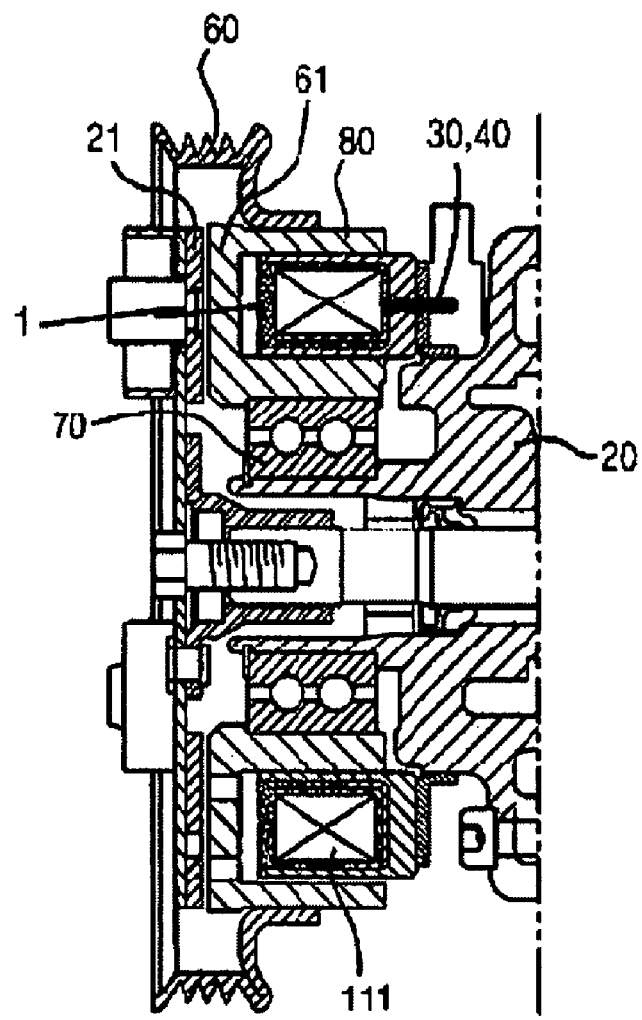
FIG. 1 is a sectional view showing a general coupling structure of a vehicle compressor and a electromagnetic clutch.
Figure 2A:
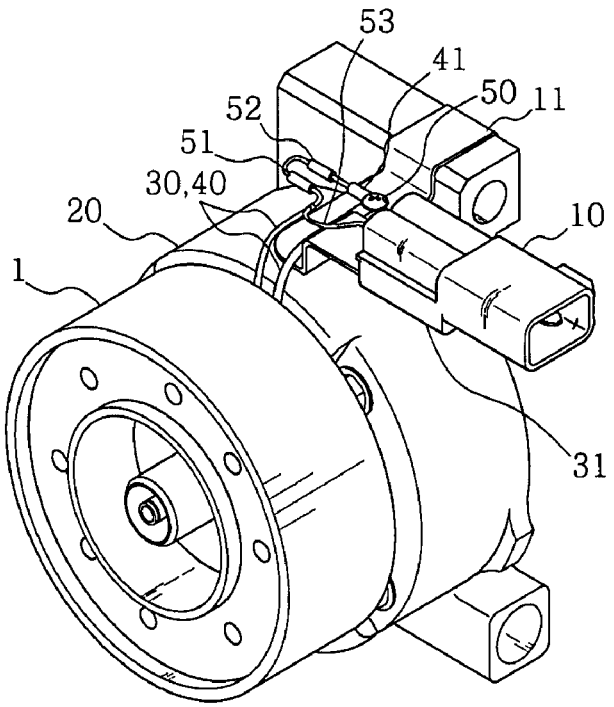
FIGS. 2a and 2b are views respectively showing a general coupling structure of a vehicle compressor and an electric power connection part of an electromagnetic clutch field coil assembly.
Figure 2B:
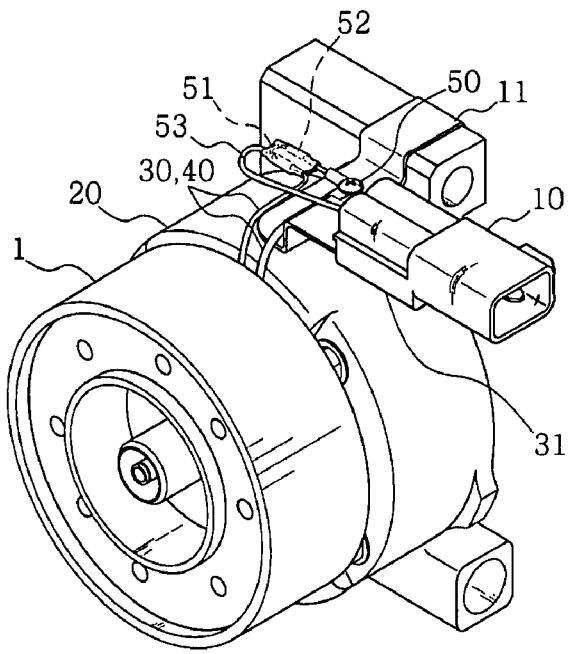

Further, as shown in FIG. 1 the electromagnetic cluth includes a pulley 60 connected from a driving shaft of the engine (not shown) through a belt (not shown) to be rotated, a rotor 80 having an outer circumferential surface coupled with the pulley 60 and an inner circumferential surface connected with the driving shaft of the compressor 20 via a bearing 70, a disc 21 fixedly coupled with the driving shaft of the compressor 20 and an electromagnetic cluth field coil assembly 10 coupled to the rotor 80.

Figure 3:
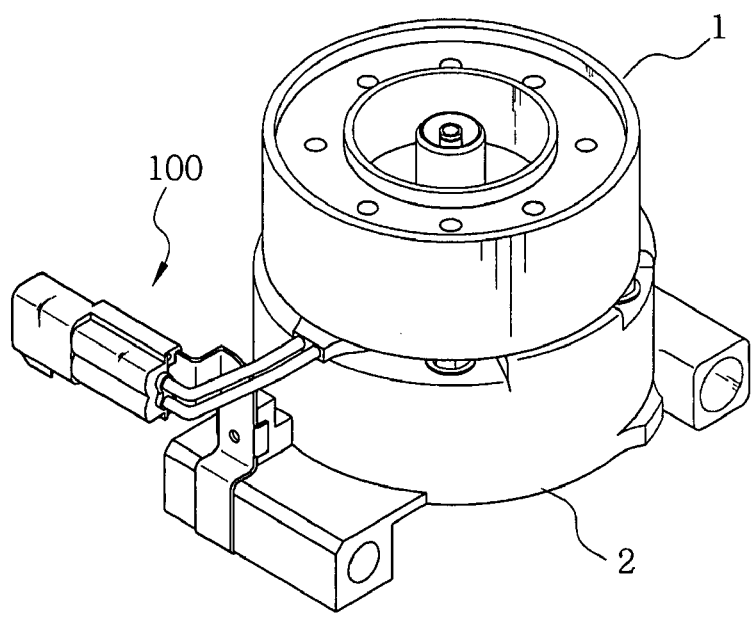
FIG. 3 is a perspective view showing a structure of an electric power connection part of an electromagnetic clutch field coil assembly according to the present invention.
Figure 4:
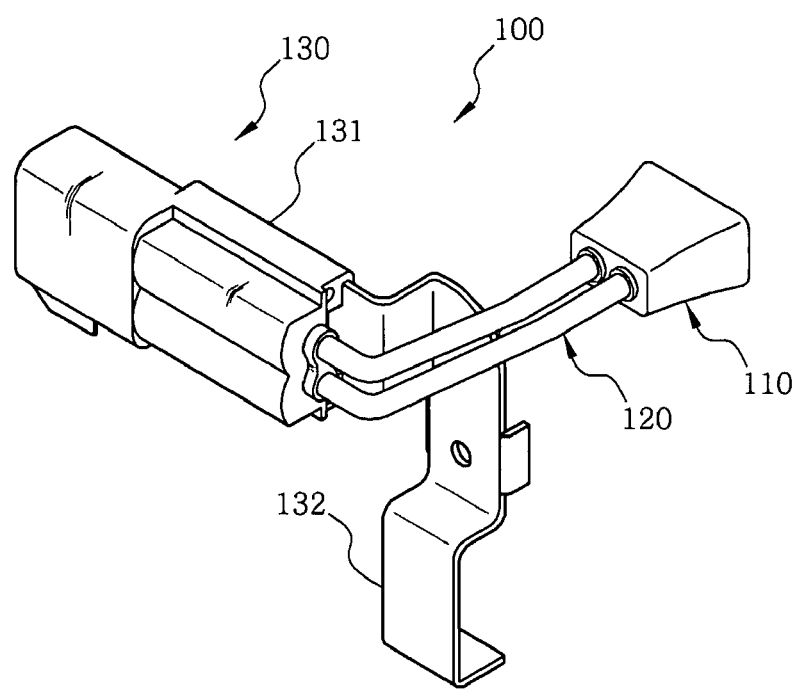
FIG. 4 is a perspective view showing the electric power connection part according to the present invention.

Herein, as shown in FIGS. 3 and 4, an electric power connection part 100 of the electromagnetic clutch field coil assembly 1 of the present invention is constituted so that one end thereof connected with the electromagnetic clutch field coil assembly 1 and the other is connected with a vehicle battery. The electric power connection part 100 includes a sleeve assembly 110, electric wires 120 and a housing assembly 130.

The sleeve assembly 110 is a member for installing the electric power connection part 100 to the electromagnetic clutch field coil assembly 1. One end of the sleeve assembly 110 is coupled to the electromagnetic clutch field coil assembly 1 by injection molding and the other is connected with the electric wires 120.

The electric wires 120 includes the plus(+) and minus(−) electric power connection lines, and one ends of the plus(+) and minus(−)electric power connection lines are connected with the sleeve assembly 110 and the others are connected with the housing assembly 130.

The housing assembly 130 is disposed at a place on a body surface of the compressor 2 so as to removably connect the electric wires 120 and the vehicle battery.

In other words, the housing assembly 130 disposed at a position which is protruded from a side surface adjacent to a middle portion in a length direction of the compressor 2 to the outside.

Accordingly, since the housing assembly 130 is disposed to be apart from the electromagnetic cluth field coil assembly 1 at a predetermined distance, it is prevented that heat generated from the electromagnetic cluth field coil assembly 1 is directly transmitted to the housing assembly 130.

The electric power connection part 100 accommodates a diode 140 as a discharge device and a resistor 150 as a magnetic field elimination device, which are core technical elements, in a status that they are connected to each other in the housing assembly 130.

The resistor 150 further has an additional function for protecting the diode 140.

The housing assembly 130 includes a housing 131 in which only the diode 140 is accommodated or the diode 140 and resistor 150 are accommodated together, and a bracket 132 of which one end is coupled with the compressor 2 and the other is removably coupled with the housing 131.

Figure 5A:
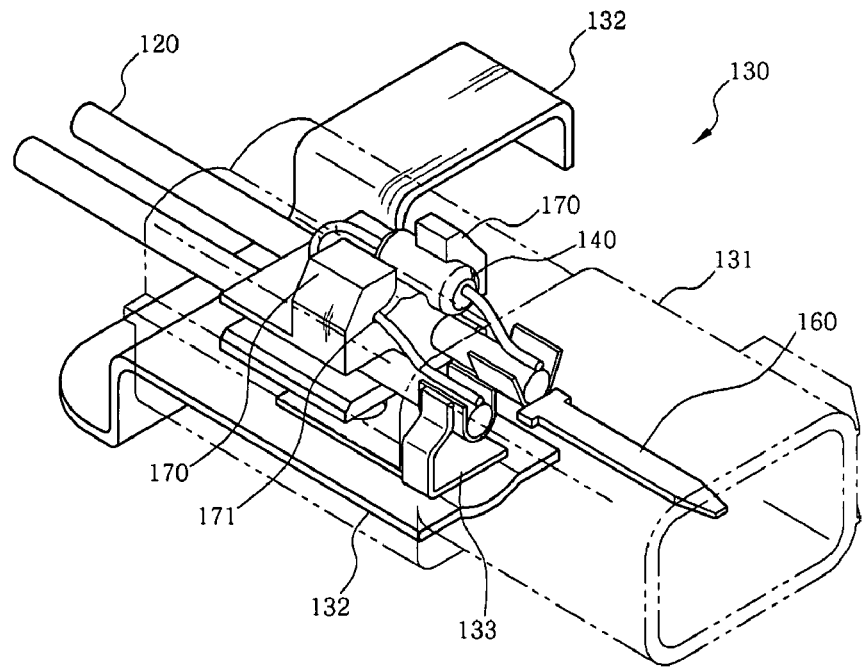
FIGS. 5a and 5b are perspective views showing a housing assembly according to the present invention.

FIG. 5a is a view showing that only the diode 140 as the discharge device is provided, wherein one end thereof is connected with a terminal 160 and the other is connected to an electrical terminal 133.

That is, the diode 140 and the terminal 160 are injection-coupled in the housing assembly 130, the diode 140 is earthed via the bracket 132 and is connected the plus(+) electric power by means of the terminal 160.

Herein, the diode 140 is fixed by a separate holder 170, a extension cord connected to the electrical terminal 133 is coupled to a slot 171 of the holder 170 and they are fixed by injection molding thereafter.

Figure 5B:
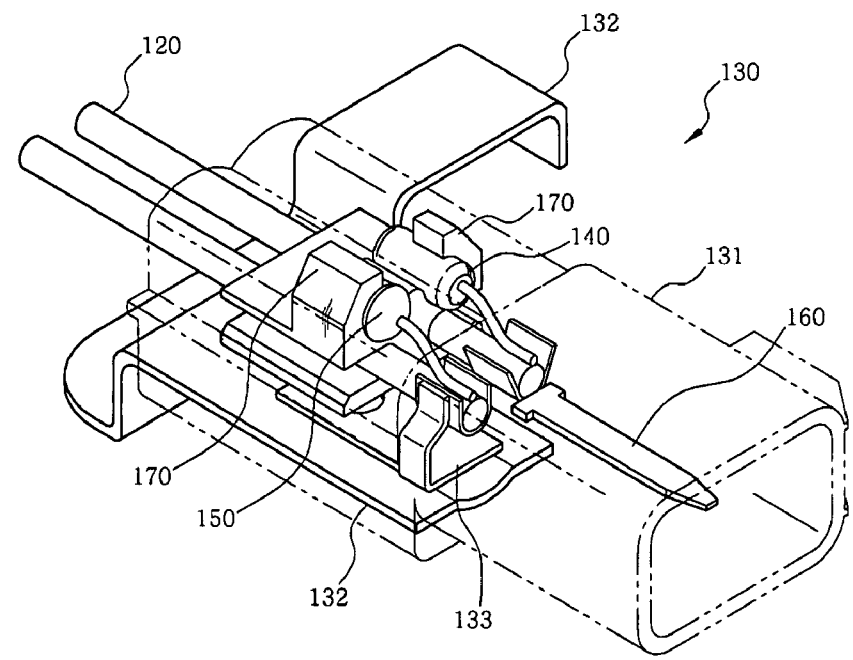

FIG. 5b shows another structure that the magnetic field elimination device 150 is connected between the diode 140 and the electrical terminal 133, wherein the diode 140 is connected with the bracket 132 through a protrusion (not shown) which is protruded from a lower side of the diode 140 and the resistor 150 is connected with the single terminal 160.

That is, the diode 140, the resistor 150 and the terminal 160 are coupled to one another by injection molding so that the resistor 150 is grounded through the bracket 132 and the diode 140 is connected to plus (+) electric power through the terminal 160.

Herein, the diode 140 and resistor 150 are coupled to each other by injection molding in a status that they are fixed by a separate holder 170. Thus, deformation or bias due to an injection molding pressure is prevented.

Meanwhile, the holder 170 is not limited to a specific shape, but may include an adhering means such as a cotton tape and an electrical insulating tape, and a belt type attaching means having Velcro.

Furthermore, since the electric wires 120 are fitted into through-holes formed at both sides of the holder 170, advance mounting is firmly established.

FIRST EMBODIMENT

Figure 6:
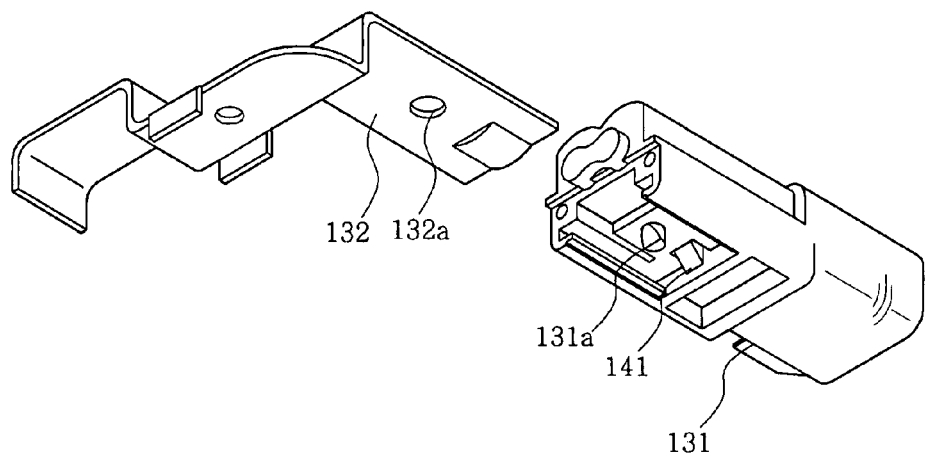
FIG. 6 is a perspective view showing a lower surface of the electric power connection part according to the present invention.
Figure 7:
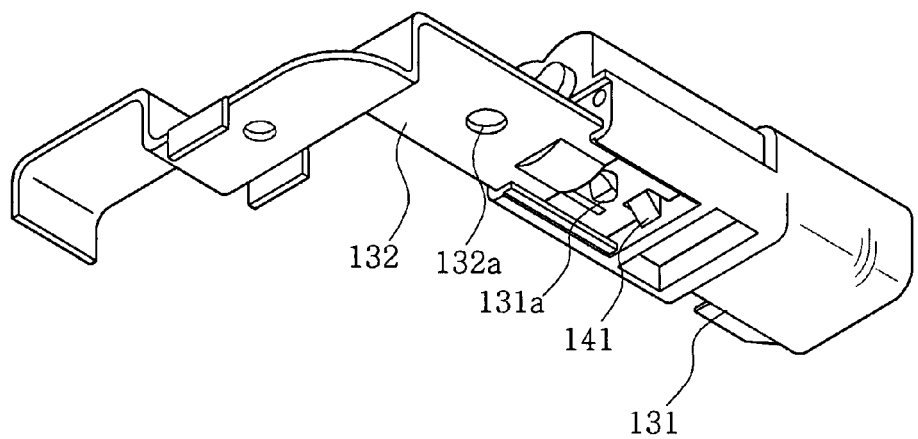
FIG. 7 is a perspective view showing one embodiment in which an electrical terminal and a bracket are coupled to each other in the electric power connection part so that electric power is supplied through a protrusion.

FIG. 6 is a perspective view showing a lower surface of the electric power connection part according to the present invention, and FIG. 7 is a perspective view showing one embodiment in which an electrical terminal and a bracket are coupled to each other in the electric power connection part so that electric power is supplied through a protrusion. In this case, when the housing 131 is coupled to the bracket 132, a projection 131a formed at the lower surface of the housing 131 is coupled to a hole 132a of the bracket 132, and a protrusion 141 formed at the electrical terminal (not shown) of the housing 131 is contacted with the bracket 132 so that the electric power is supplied.

SECOND EMBODIMENT

Figure 8:
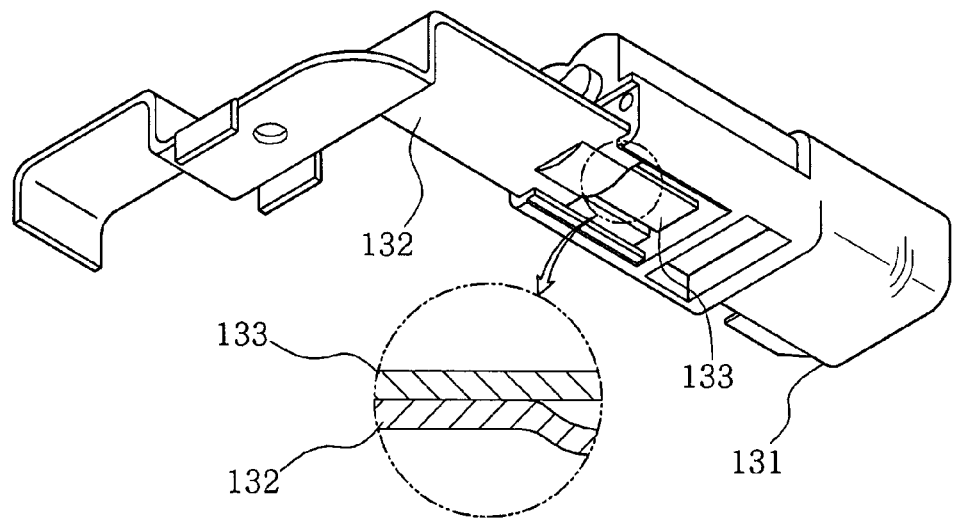
FIG. 8 is a perspective view showing another embodiment in which an electrical terminal and a bracket are coupled so as to be surface-contacted to each other in the electric power connection part so that electric power is supplied through a protrusion.

FIG. 8 is a perspective view showing another embodiment in which an electrical terminal and a bracket are coupled so as to be surface-contacted to each other in the electric power connection part so that electric power is supplied through a protrusion. Herein, the electrical terminal 133 is formed to be exposed from the lower surface of the housing 131 to the outside, and when the bracket 132 is fitted into a slot of the housing 131 in a sliding manner, the electrical terminal 133 is surface-contacted with the bracket 132 so that the electric power is supplied.

THIRD EMBODIMENT

Figure 9:
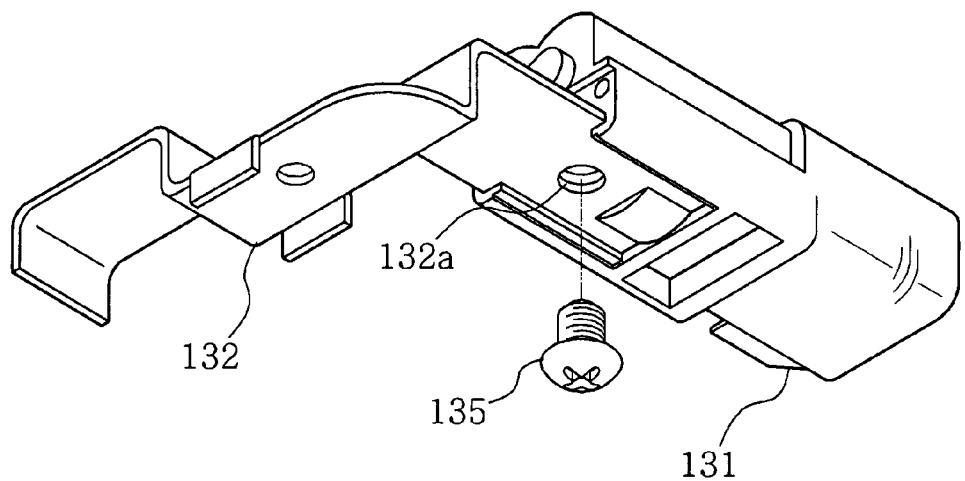
FIG. 9 a perspective view showing yet another embodiment in which an electrical terminal and a bracket are coupled by a bolt in the electric power connection part so that electric power is supplied through a protrusion.

FIG. 9 a perspective view showing yet another embodiment in which an electrical terminal and a bracket are coupled by a bolt in the electric power connection part so that electric power is supplied through a protrusion. In this case, the electrical terminal 133 is formed to be exposed from the lower surface of the housing 131 to the outside, and the bracket 132 is coupled with the housing 131 and then closely contacted with the electrical terminal 133 by the bolt 135 so that the electric power is supplied.

FOURTH EMBODIMENT

In addition, as yet another embodiment, the electrical terminal 133 is formed to be exposed from the lower surface of the housing 131 to the outside, and a portion (not shown) which is surface-contacted between the electrical terminal 133 and the bracket 132 is welded, thereby firmly coupling therebetween

INDUSTRIAL APPLICABILITY

According to the present invention of a configuration described above, since the electric power connection part has the discharge device, the magnetic field elimination device and the terminal which are integrally formed by injection molding and the electric power connection part is coupled to the compressor through the bracket, it is possible to rapidly and facilely perform the assembling process, increase the productivity and also reduce fabricating costs.

Further, since the magnetic field elimination device is connected with the compressor through the bracket and the discharge device is connected with the terminal, it is possible to rapidly and facilely connect them through the single terminal.

Furthermore, since the magnetic field elimination device, the discharge device and wires are connected to each other through the holder, it is facile to perform the assembling process and also prevent the deformation or bias due to an injection molding pressure.

In addition, since the electric power connection part is removably coupled with the compressor body through the bracket, it is facile to perform the assembling process.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An electric power connection part of an electromagnetic clutch field coil assembly connected with an electric power connector at a side of a vehicle engine, wherein the electric power connection part comprises a sleeve assembly which is installed at the electromagnetic clutch field coil assembly, and a housing assembly which is connected with the sleeve assembly through electric wires; the housing assembly comprises a housing which accommodates a discharge device for absorbing a surge voltage, and a bracket of which one end is coupled with a compressor and the other is coupled with the housing; one end of the discharge device is connected with a terminal connected with the electric power connector and the other end of the discharge device is connected with an electrical terminal which is electrically connected with the bracket.

2. The electric power connection part of an electromagnetic clutch field coil assembly as set forth in claim 1, wherein a magnetic field elimination device for eliminating a residual magnetic field is connected between the discharge device and the electrical terminal.

3. The electric power connection part of an electromagnetic clutch field coil assembly as set forth in claim 1, wherein the electrical terminal has a protrusion formed at a lower side thereof so as to be electrically connected with the bracket.

4. The electric power connection part of an electromagnetic clutch field coil assembly as set forth in claim 1, wherein the electrical terminal has a lower side thereof which is surface-contacted with the bracket so as to be electrically connected with the bracket.

5. The electric power connection part of an electromagnetic clutch field coil assembly as set forth in claim 1, wherein the electrical terminal is coupled with the bracket by a bolt so as to be electrically connected.

6. The electric power connection part of an electromagnetic clutch field coil assembly as set forth in claim 1, wherein the electrical terminal is welded with the bracket so as to be electrically connected.

7. The electric power connection part of an electromagnetic clutch field coil assembly as set forth in claim 1, wherein the discharge device, the terminal and the electrical terminal are injection-coupled to one another in the housing assembly.

8. The electric power connection part of an electromagnetic clutch field coil assembly as set forth in claim 7, wherein the discharge device is injection-coupled in a status of being fixed by a holder.

9. The electric power connection part of an electromagnetic clutch field coil assembly as set forth in claim 2, wherein the discharge device, the magnetic field elimination device, the terminal and the electrical terminal is injection-coupled in the housing assembly.

10. The electric power connection part of an electromagnetic clutch field coil assembly as set forth in claim 9, wherein the discharge device and the magnetic field elimination device are injection-coupled in a status of being fixed by a holder.

11. The electric power connection part of an electromagnetic clutch field coil assembly as set forth in claim 1, wherein the discharge device is a diode.

12. The electric power connection part of an electromagnetic cluth field coil assembly as set forth in claim 2, wherein the magnetic field elimination device is a resistor.

* * * * *